United States Patent
Tagesson et al.

(10) Patent No.: US 11,858,492 B2
(45) Date of Patent: Jan. 2, 2024

(54) METHOD FOR ESTIMATING A MAXIMUM SAFE ARTICULATION ANGLE TO BE USED IN REVERSING OF A VEHICLE COMBINATION

(71) Applicant: Volvo Truck Corporation, Gothenburg (SE)

(72) Inventors: Kristoffer Tagesson, Gothenburg (SE); Staffan Rödjedal, Torslanda (SE)

(73) Assignee: Volvo Truck Corporation, Gothenburg (SE)

( * ) Notice: Subject to any disclaimer, the term of this patent is extended or adjusted under 35 U.S.C. 154(b) by 164 days.

(21) Appl. No.: 17/047,281

(22) PCT Filed: Apr. 16, 2018

(86) PCT No.: PCT/EP2018/025117
§ 371 (c)(1),
(2) Date: Oct. 13, 2020

(87) PCT Pub. No.: WO2019/201410
PCT Pub. Date: Oct. 24, 2019

(65) Prior Publication Data
US 2021/0291900 A1  Sep. 23, 2021

(51) Int. Cl.
*B60W 30/18* (2012.01)
*B60W 50/00* (2006.01)
(Continued)

(52) U.S. Cl.
CPC .. *B60W 30/18036* (2013.01); *B60W 50/0097* (2013.01); *B60W 50/14* (2013.01);
(Continued)

(58) Field of Classification Search
CPC ....... B60W 30/18036; B60W 50/0097; B60W 50/14; B60W 2530/203; B60W 2530/207;
(Continued)

(56) References Cited

U.S. PATENT DOCUMENTS

| 5,001,639 A | 3/1991 | Breen |
| 9,623,904 B2 * | 4/2017 | Lavoie .................. B60W 40/10 |

(Continued)

FOREIGN PATENT DOCUMENTS

| CN | 104768839 A | 7/2015 |
| CN | 104884337 A | 9/2015 |

(Continued)

OTHER PUBLICATIONS

International Search Report and Written Opinion for PCT/EP2018/025117, dated Feb. 5, 2019, 10 pages.

(Continued)

*Primary Examiner* — Peter D Nolan
*Assistant Examiner* — Wae L Louie
(74) *Attorney, Agent, or Firm* — Withrow & Terranova, PLLC

(57) ABSTRACT

The disclosure relates to a method for estimating a maximum safe articulation angle (Φlim) to be used in reversing of a vehicle combination (1) comprising a towing vehicle (10) and at least one trailer (20), said method comprising: S1) providing a preset maximum safe articulation angle (Φlim) for the towing vehicle (10) or the vehicle combination (1), S2) receiving a signal being indicative of an articulation angle (Φ) of the vehicle combination (1) during forward driving of the vehicle combination (1), and S3) updating the maximum safe articulation angle (Φlim) when the articulation angle (Φ) of the vehicle combination (1) during forward driving is larger than the preset maximum safe articulation angle (Φlim). The disclosure also relates to a method for reversing a vehicle combination (10), to a control unit (11), to a towing vehicle (10), to a computer program and to a computer readable medium.

12 Claims, 2 Drawing Sheets

(51) Int. Cl.
*B60W 50/14* (2020.01)
*B62D 13/06* (2006.01)
*B60R 21/013* (2006.01)

(52) U.S. Cl.
CPC ............ *B62D 13/06* (2013.01); *B60R 21/013* (2013.01); *B60W 2050/0075* (2013.01); *B60W 2050/0083* (2013.01); *B60W 2050/143* (2013.01); *B60W 2520/105* (2013.01); *B60W 2520/125* (2013.01); *B60W 2520/14* (2013.01); *B60W 2520/16* (2013.01); *B60W 2520/18* (2013.01); *B60W 2520/22* (2013.01); *B60W 2530/203* (2020.02); *B60W 2530/207* (2020.02); *B60W 2540/12* (2013.01); *B60W 2540/18* (2013.01); *B60W 2540/229* (2020.02); *B60W 2556/45* (2020.02); *B60W 2710/18* (2013.01)

(58) Field of Classification Search
CPC ..... B60W 2520/105; B60W 2520/125; B60W 2520/14; B60W 2520/16; B60W 2520/18; B60W 2520/22; B60W 2550/0075; B60W 2550/143; B60W 2540/12; B60W 2540/18; B60W 2540/229
See application file for complete search history.

(56) References Cited

U.S. PATENT DOCUMENTS

| | | | | |
|---|---|---|---|---|
| 9,676,377 | B2* | 6/2017 | Hafner | B60D 1/36 |
| 9,827,818 | B2* | 11/2017 | Hu | H04N 7/18 |
| 10,155,478 | B2* | 12/2018 | Hu | G06T 7/74 |
| 10,384,607 | B2* | 8/2019 | Lavoie | B62D 13/06 |
| 10,829,046 | B2* | 11/2020 | Nagasamy | G06N 3/08 |
| 11,077,795 | B2* | 8/2021 | Jales Costa | G06T 3/4046 |
| 11,358,637 | B2* | 6/2022 | Kroeze | G01S 17/931 |
| 2014/0277942 | A1* | 9/2014 | Kyrtsos | G01B 21/02 |
| | | | | 702/159 |
| 2014/0343795 | A1 | 11/2014 | Lavoie | |
| 2015/0066296 | A1 | 3/2015 | Trombley et al. | |
| 2015/0298738 | A1* | 10/2015 | Hoel | B60W 30/06 |
| | | | | 701/41 |
| 2015/0344067 | A1 | 12/2015 | Lavoie et al. | |
| 2016/0023526 | A1 | 1/2016 | Lavoie | |
| 2016/0229452 | A1* | 8/2016 | Lavoie | B62D 13/06 |
| 2017/0008560 | A1 | 1/2017 | Kyrtsos et al. | |
| 2017/0073005 | A1* | 3/2017 | Ghneim | B62D 13/06 |
| 2017/0174130 | A1* | 6/2017 | Hu | B60C 5/00 |
| 2017/0297619 | A1 | 10/2017 | Lavoie et al. | |
| 2021/0114597 | A1* | 4/2021 | Tagesson | B62D 13/06 |
| 2021/0291900 | A1* | 9/2021 | Tagesson | B60W 50/0097 |
| 2022/0185329 | A1* | 6/2022 | Deragarden | B60D 1/36 |

FOREIGN PATENT DOCUMENTS

| | | |
|---|---|---|
| CN | 204623563 U | 9/2015 |
| CN | 107000741 A | 8/2017 |
| FR | 2587962 A1 | 4/1987 |
| JP | H01156180 A | 6/1989 |

OTHER PUBLICATIONS

International Preliminary Report on Patentability for PCT/EP2018/025117, dated Apr. 16, 2020, 27 pages.
International Search Report and Written Opinion for International Patent Application No. PCT/EP2019/059547, dated Jul. 3, 2019, 11 pages.
Bao, Y.-T. et al., "A Design of the Heavy Hydraulic Combinable Semi-trailer," Hydraulic and Pneumatic, Issue 5, May 2006, pp. 14-15.
Shan, W. et al., ""Longitudinal train dynamics of electric multiple units under rescue,"" Journal of Modern Transportation, vol. 25, No. 4, Sep. 2017, Springer, pp. 250-260.
Zhu, Z., "Research progress on vehicle active safety regulations and test methods," Light Vehicle Technology, No. 209, Jan. 2007, pp. 26-31.
First Office Action for Chinese Patent Application No. 201880092409.7, dated Sep. 5, 2022, 14 pages.
Non-Final Office Action for U.S. Appl. No. 17/047,505, dated Nov. 14, 2022, 33 pages.
Notice of Allowance for U.S. Appl. No. 17/047,505, dated Sep. 13, 2023, 8 pages.
Applicant-Initiated Interview Summary for U.S. Appl. No. 17/047,505, dated Aug. 7, 2023, 19 pages.
Advisory Action, Examiner-Initiated Interview Summary, and AFCP 2.0 Decision for U.S. Appl. No. 17/047,505, dated Aug. 10, 2023, 5 pages.

* cited by examiner

METHOD FOR ESTIMATING A MAXIMUM SAFE ARTICULATION ANGLE TO BE USED IN REVERSING OF A VEHICLE COMBINATION

This application is a 35 USC 371 national phase filing of International Application No. PCT/EP2018/025117, filed Apr. 16, 2018, the disclosure of which is incorporated herein by reference in its entirety.

TECHNICAL FIELD

The invention relates to a method for estimating a maximum safe articulation angle to be used in reversing of a vehicle combination comprising a towing vehicle and at least one trailer. Moreover, the invention relates to a method for reversing a vehicle combination comprising a towing vehicle and at least one trailer.

The invention can be applied in heavy-duty vehicles, such as trucks, buses and construction equipment. Although the invention will be described with respect to a truck, the invention is not restricted to this particular vehicle, but may also be used for any kind of towing vehicles connectable to a trailer.

BACKGROUND

Reversing of a vehicle combination, e.g. a trailer connected to a towing vehicle, is by many recognized as a challenging task. When a driver is reversing such a vehicle combination, the reversing speed usually has to be lower compared to if no trailer is connected to the vehicle.

One issue that should be avoided during a reversing operation is to reach a so called jack-knifing condition. Jack-knifing is a well-known issue for vehicle combinations, and may be defined as the folding of the vehicle combination between two connected members, e.g. truck/trailer or trailer/trailer, so that it resembles the acute angle of a folding pocket knife. In other words, a jack-knifing condition may be regarded as the condition when two connected members of the vehicle combination have reached an articulation angle such that the two members hit/crash into each other.

On the other hand, in order to be able to reverse a vehicle combination in an efficient manner, it may also be important to avoid a too large safety margin before reaching the jack-knifing condition.

US patent application no. 2015/066296 A1 discloses a trailer identification system for trailer backup assist. The system communicates predetermined trailer parameters, which are embedded on a tag attached to the trailer, to a controller in the trailer backup assist system. A trailer backup assist system is configured using the predetermined trailer parameters and the configured trailer backup assist system is activated to operate using the trailer parameters.

SUMMARY

An object of the invention is to provide an improved method for estimating a maximum safe articulation angle to be used in reversing of a vehicle combination. Another object of the invention is to provide an improved method for reversing a vehicle combination comprising a towing vehicle and at least one trailer.

According to a first aspect of the invention, the objects are achieved by a method according to claim 1. According to a second aspect of the invention, the objects are achieved by a method according to claim 5. According to a third aspect of the invention, the objects are achieved by a control unit according to claim 12. According to a fourth aspect of the invention, the objects are achieved by a towing vehicle according to claim 13. According to a fifth aspect of the invention, the objects are achieved by a computer program according to claim 16. According to a sixth aspect of the invention, the objects are achieved by computer readable medium carrying a computer program according to claim 17.

According to the first aspect thereof, the objects are achieved by a method for estimating a maximum safe articulation angle to be used in reversing of a vehicle combination comprising a towing vehicle and at least one trailer, the method comprising:
  providing a preset maximum safe articulation angle for the towing vehicle or the vehicle combination,
  receiving a signal being indicative of an articulation angle of the vehicle combination during forward driving of the vehicle combination, and
  updating the maximum safe articulation angle when the articulation angle of the vehicle combination during forward driving is larger than the preset maximum safe articulation angle.

By the provision of the aforementioned method, an improved method of obtaining a maximum safe articulation angle to be used during reversing of a vehicle combination is obtained. More particularly, updating the maximum safe articulation angle when it is recognized that a larger angle is used during forward driving provides an increased flexibility during a reversing operation. Towing vehicles' and trailers' dimensions are generally not standardized. This is for example the case for heavy-duty towing trucks and trailers, where the towing truck during operation is usually switching between towing different types of trailers. The trailers may have very different dimensions and proportions, which also may not be known beforehand. In addition, a trailer's dimensions and proportions may also change over time. For example, a trailer loaded with a bulky cargo extending outside the outer perimeter of the trailer will increase the width of the trailer. Correspondingly, a trailer width may be decreased when a bulky cargo is removed therefrom. Therefore, the maximum safe articulation angle to be used during reversing may be very different depending on the type of trailer connected to the towing vehicle. By the provision of the aforementioned method, an improved estimation of the maximum safe articulation angle can be performed due to that the articulation angle during forward driving is recorded and used for updating the maximum safe articulation angle. Additionally, an advantage of the present invention is that it provides a simple and efficient way of updating the maximum safe articulation angle without a need of knowing the dimensions/proportions of the vehicle combination. Instead, only the provided articulation angle during forward driving may be required for updating the maximum safe articulation angle.

The maximum safe articulation angle may be defined as an articulation angle which should not be exceeded in order to avoid a jack-knifing condition. Thus, this angle may be used as a limit during a reversing operation to thereby avoid the jack-knifing condition. An articulation angle is commonly the articulation angle between the towing vehicle and the trailer, but it may also be an articulation angle between two connected trailers. Hence, the vehicle combination may also be a series of connected vehicles and comprise at least one towing vehicle and a plurality of trailers connected thereto.

Moreover, at least in the case of manual driving it is in general easier for a driver to avoid running into a jack-knifing situation when driving forwards than what it is when reversing. This is because, in forward driving, an articulated vehicle combination will straighten out if the steering wheel angle is reduced. In reverse driving this is in general not the case. This difference is utilized by the present invention, in the respect that a driver's ability in conveying a vehicle combination safely in forward direction is translated so that also reversing can be made safer.

A preset maximum safe articulation angle may be an angle which is preset for the specific towing vehicle and/or vehicle combination. The preset angle may also be entered manually by e.g. an operator of the towing vehicle or obtained from a database.

The signal received which is indicative of the articulation angle of the vehicle combination during forward driving of the vehicle combination may be obtained by different means. For example, the signal may be provided by an angle sensor that measures the articulation angle between two connected vehicle units, e.g. truck/trailer. Alternatively, or complementary, the signal indicative of the articulation angle may comprise information from a camera estimating a distance to the connected vehicle, a distance sensor, a position signal from e.g. a GPS (Global Positioning System) on the connected vehicle, or any other means that can provide the articulation angle.

Optionally, the signal being indicative of the articulation angle may be continuously or intermittently recorded during forward driving. For example, if the signal is intermittently recorded, the articulation angle during forward driving may not need to be recorded until the articulation angle reaches a certain threshold value, which value may be close to the preset maximum safe articulation angle, such as 30, 20 or 10 degrees from the preset maximum safe articulation angle. Alternatively, or complementary, the articulation angle during forward driving may only be recorded at certain speeds of the vehicle combination, at certain time intervals etc. In the latter example, an operator of the vehicle combination may for example select when the articulation angle should be recorded, such as when the operator recognizes that a large articulation angle is used during forward driving of the vehicle combination.

Optionally, the method may further comprise the additional step of:
updating the maximum safe articulation angle when it has been determined that a jack-knifing condition has occurred, whereby the updated maximum safe articulation angle corresponds to an articulation angle which occurred prior to the determined jack-knifing condition. This updating of the maximum safe articulation angle may be determined in any one of a forward driving or reversing situation of the vehicle combination.

Hence, if it is determined that a jack-knifing condition has occurred, the maximum safe articulation angle may be updated, thereby providing a maximum safe articulation angle which better corresponds to the true jack-knifing angle of the vehicle combination. An angle occurring prior to the determined jack-knifing condition may be an angle which is offset by certain degrees from the jack-knifing angle, such as 10, 9, 8, 7, 6, 5, 4, 3, 2, 1 degree(s) or less from the determined jack-knifing angle. Alternatively, or complementary, the angle occurring prior to the determined jack-knifing condition may be an angle which is recorded a certain time period prior to the jack-knifing condition occurred, such as 10, 9, 8, 7, 6, 5, 4, 3, 2, 1 second(s) or less prior to when the determined jack-knifing condition occurred.

Still optionally, the jack-knifing condition may be determined by receiving a signal that indicates that at least one of the following events has occurred:
an emergency call from the vehicle combination has been issued,
an airbag of the towing vehicle has been deployed,
a yaw, pitch or roll rate for the towing vehicle or the at least one trailer has exceeded a preset threshold value,
a longitudinal or lateral acceleration for the towing vehicle or the at least one trailer has exceeded a preset threshold value,
a force in a trailer coupling has exceeded a preset threshold value,
a speed reduction of the towing vehicle or the vehicle combination has exceeded a preset threshold value,
a value being indicative of a second time derivative of the articulation angle has exceeded a preset threshold value.

Hence, by using a signal that indicates any one of the above mentioned events, an improved identification of a jack-knifing condition may be obtained, which in turn may provide an improved value for the updated maximum safe articulation angle.

Optionally, the updated maximum safe articulation angle may also be shared with other vehicles. For example, if it is determined that a specific type of towing vehicle and trailer combination can have a larger maximum safe articulation angle, that information may be shared to other towing vehicles which are of similar type. Purely by way of example, the information may be shared by wireless transmission, e.g. 5g, 4g, 3g, Bluetooth, WiFi communication. The updated information may also be stored in a database, placed in the vehicle and/or in a remote database.

According to the second aspect thereof, the objects are achieved by a method for reversing a vehicle combination comprising a towing vehicle and at least one trailer, the method comprising:
reversing the vehicle combination,
determining whether a jack-knifing condition is about to occur by comparing a predicted future estimate of the articulation angle with the maximum safe articulation angle as estimated according to any one of the embodiments of the first aspect of the invention, and when it is determined that the jack-knifing condition is about to occur, perform at least one of the following steps:
issue a warning signal, and
initiate a braking action for the vehicle combination.

By the provision of the aforementioned method, an improved reversing operation may be obtained, which is safe and provides increased flexibility by using the updated maximum safe articulation angle. Hence, larger articulation angles may therefore be used during reversing. Additionally, by issuing a warning signal and/or initiate a braking action if it is determined that the jack-knifing condition is about to occur, a safer reversing may be obtained. It shall be noted that all embodiments of the first aspect of the invention are applicable to all of the embodiments of the second aspect of the invention, and vice versa. The predicted future estimate of the articulation is an estimate of the articulation angle which the vehicle combination will have at a later point in time during the reversing operation. Hence, during a reversing operation, it is possible to estimate the evolvement of the articulation angle. The braking action may be initiated by for example a driver assistance system of the towing vehicle. The warning signal may be any kind of warning signal, such as a warning signal to a driver of the vehicle being in the form of a visual warning, acoustic warning, tactile warning or any combination thereof. The warning signal may also be any kind of warning signal to a remote operator/user of the vehicle combination, e.g. if the towing vehicle is an autonomous vehicle or remotely controlled.

Optionally, the predicted future estimate of the articulation angle may be derived from the current articulation angle and a first order time derivative of the current articulation angle. The current articulation angle is the articulation angle which the vehicle combination currently has during the reversing operation. The first order time derivative of the current articulation angle may also be derived from a first order vehicle travel distance derivative of the articulation angle and a reversing speed of the vehicle. Still optionally, the predicted future estimate of the articulation angle may be derived from the current articulation angle and a second order time derivative of the current articulation angle. Similarly, the second order time derivative of the current articulation angle may also be derived from a second order vehicle travel distance derivative of the articulation angle and a reversing speed of the vehicle.

Optionally, the braking action may be initiated when the following condition is fulfilled:

$$\left| \phi + \frac{\dot{\phi} v_x}{a_x} + \ddot{\phi}\left(\frac{v_x}{a_x}\right)^2 / 2 \right| > \phi_{lim}$$

wherein $v_x$ corresponds to a reversing speed, $a_x$ corresponds to an achievable acceleration rate of the vehicle combination's braking system, $\phi$ corresponds to the articulation angle, $\dot{\phi}$ corresponds to the first order time derivative of the articulation angle, $\ddot{\phi}$ rip corresponds to the second order time derivative of the articulation angle and $\phi_{lim}$ corresponds to the maximum safe articulation angle. The first and second order time derivatives may here also be replaced by the first and second order vehicle travel distance derivatives of the articulation angle and a reversing speed of the vehicle.

Optionally, the warning signal may be issued when the following condition is fulfilled:

$$\left| \phi + \dot{\phi}\left(\frac{v_x}{a_x} + t_{reac}\right) + \ddot{\phi}\left(\frac{v_x}{a_x} + t_{reac}\right)^2 / 2 \right| > \phi_{lim}$$

wherein $v_x$ corresponds to the reversing speed, $a_x$ corresponds to the achievable acceleration rate of the vehicle combination's braking system, $\phi$ corresponds to the articulation angle, $\dot{\phi}$ corresponds to the first order time derivative of the articulation angle, $\ddot{\phi}$ corresponds to the second order time derivative of the articulation angle ($\phi$), $t_{reac}$ corresponds to an estimated driver reaction time from the warning signal is issued until a braking action has been initiated by the driver and $\phi_{lim}$ corresponds to the maximum safe articulation angle. The first and second order time derivatives may here also be replaced by the first and second order vehicle travel distance derivatives of the articulation angle and a reversing speed of the vehicle. The estimated driver reaction time may be differently set depending on the driver. Examples of driver reaction times are 1 second or tenths of a second, such as 0.1, 0.2, 0.3, 0.4 seconds or more.

Optionally, a value being indicative of a current steering wheel angle or a first time derivative of the steering wheel angle may also used for determining if a jack-knifing condition is about to occur. This may further improve the estimation of the predicted future estimate of the articulation angle. The steering wheel angle and the derivative of the steering wheel angle may correlate to the articulation angle and the derivative of the articulation angle and may therefore be used for estimating a predicted future estimate of the articulation angle.

Optionally, at least one of a steering operation and a speed control operation of the vehicle combination during reversing may be performed automatically without any direct human involvement. Thus, the reversing operation may be semi-automatic or even fully automatic. For example, the driver may only instruct the towing vehicle to start a reversing operation to a certain destination, such as a loading/unloading docking station, and thereafter let the towing vehicle automatically reverse with the trailer(s) until it reaches its destination. Hence, by the provision of the invention, the reversing operation may be performed at higher speeds without compromising with safety.

Optionally, the warning signal may comprise different levels/amplitudes depending on how close to the jack-knifing condition the vehicle combination comes. Hence, it may also be estimated how long time it will take until the vehicle combination reaches a jack-knifing condition if continuing the reversing operation.

Optionally, the initiated braking action may be interrupted or even deactivated by e.g. a driver of the towing vehicle when pressing on an acceleration pedal in the towing vehicle. There may be situations when the driver may "override" the intention of the method, such as if the driver wants to reach a jack-knifing condition.

According to the third aspect thereof, the objects are achieved by a control unit for controlling a towing vehicle, wherein the control unit is configured to perform the steps of the method according to any one of the embodiments of the first aspect of the invention and/or the steps of the method according to any one of the embodiments of the second aspect of the invention. Hence, the methods as disclosed herein may advantageously be integrated into a control unit. The control unit may preferably be integrated into the towing vehicle. The advantages of the control unit are largely analogous to the advantages provided by the methods as disclosed herein, and will therefore not be further elaborated here. In addition, all aspects of the third aspect of the invention are applicable to all aspects of the first and second aspects of the invention, and vice versa.

According to the fourth aspect thereof, the objects are achieved by a towing vehicle comprising a control unit according to any one of the embodiments of the third aspect of the invention. The advantages of the towing vehicle are largely analogous to the advantages provided by the control unit and the methods as disclosed herein, and will therefore not be further elaborated here. In addition, all aspects of the fourth aspect of the invention are applicable to all aspects of the first, second and third aspects of the invention, and vice versa.

Optionally, the towing vehicle may be a semi-autonomous or a fully autonomous vehicle.

As already indicated hereinabove, the towing vehicle may be connected to at least one trailer, whereby an articulation angle may be any one of the articulation angles between two interconnected vehicles, i.e. towing vehicle/trailer and trailer/trailer. Still further, even though the invention is mainly described in relation to towing trucks, it may likewise be used for other types of towing vehicles, such as passenger vehicles, i.e. passenger cars, construction equipment vehicles, buses etc.

Optionally, the towing vehicle may comprise means for measuring and/or estimating an articulation angle between the towing vehicle and a connected trailer and/or between two interconnected trailers. As already mentioned hereinabove, the means for measuring and/or estimating the articulation angle may be an angle sensor that measures the articulation angle between two connected vehicles, e.g. truck/trailer. Alternatively, or complementary, the signal indicative of the articulation angle may comprise information from a camera estimating a distance to the connected vehicle, a distance sensor, a position signal from e.g. a GPS (Global Positioning System) on the connected vehicle, or any other means that can provide a measurement or estimation of the articulation angle.

According to the fifth aspect thereof, the objects are achieved by a computer program comprising program code means for performing the steps of any one of the embodiments of the methods of the first and second aspect of the invention when said program is run on a computer.

According to the sixth aspect thereof, the objects are achieved by a computer readable medium carrying a computer program comprising program code means for performing the steps of any one of the embodiments of the methods of the first and second aspect of the invention when said program product is run on a computer.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

Figure 1:
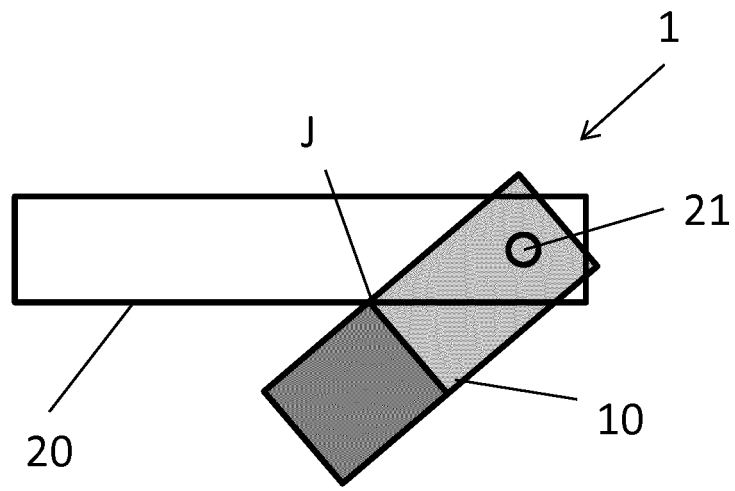
FIG. 1 is showing a schematic illustration of a vehicle combination according to an example embodiment of the present invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

In FIG. 1, a schematic illustration of a vehicle combination 1, seen from above, according to an example embodiment of the present invention is depicted. The vehicle combination 1 comprises a towing vehicle 10, in this embodiment a towing truck, and a trailer 20 connected to the towing truck 10 via a coupling 21. The towing vehicle 10 and the trailer 20 are pivotably movable around the coupling 21, whereby an articulation angle $\phi$ of the vehicle combination 1 is the relative angle between the towing vehicle 10 and the trailer 20 in respect of the coupling 21. For more details about the articulation angle $\phi$, see e.g. FIGS. 4 and 5. FIG. 1 illustrates when the vehicle combination 1 has reached a jack-knifing condition J, i.e. the towing vehicle 10 and the trailer 20 have reached such a large articulation angle $\phi$ that the two vehicles, truck/trailer, have hit into each other at the point J. In one example embodiment, a cabin of the truck 10 may have hit a side of the trailer 20. During a reversing operation of the vehicle combination 1, it may be important to avoid reaching the jack-knifing condition J. Thereby it may be required to provide a preset maximum safe articulation angle during the reversing operation. The preset angle may for example be provided to the driver, e.g. via a display, such that the driver during reversing checks that the maximum safe articulation angle is not reached by comparing said angle to the current articulation angle $\phi$. Alternatively, or complementary, a driver assistance system may use the maximum safe articulation angle as input during the reversing operation for controlling the reversing operation. Hence, the driver assistance system may control the reversing operation such that the articulation angle $\phi$ will not exceed the maximum safe articulation angle $\phi_{lim}$. By the provision of the present invention, a more efficient reversing operation may be accomplished. More particularly, by receiving a signal being indicative of the articulation angle $\phi$ during forward driving of the vehicle combination 1, and updating the preset maximum safe articulation angle $\phi_{lim}$ when the articulation angle $\phi$ of the vehicle combination 1 during forward driving is larger than the preset maximum safe articulation angle $\phi_{lim}$ an even larger range of articulation angles $\phi$ may be allowed during a subsequent reversing operation without reaching the jack-knifing condition J.

Figure 2:
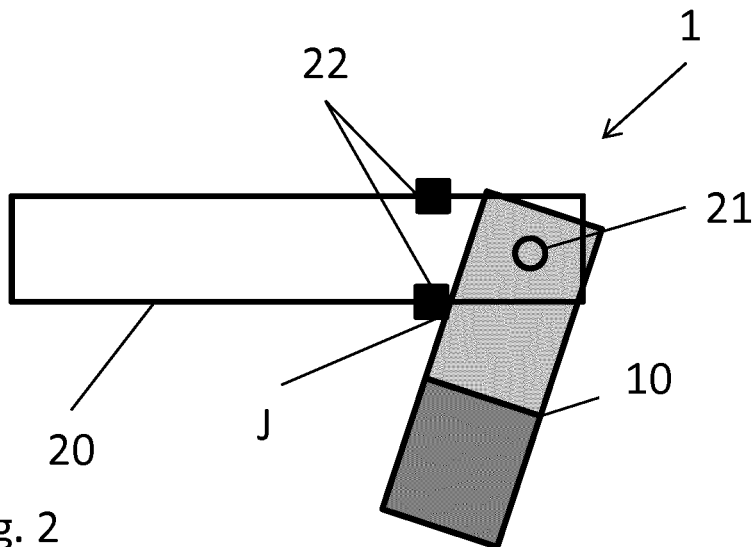
FIG. 2 is showing another schematic illustration of a vehicle combination according to an example embodiment of the present invention.

In FIG. 2, another schematic illustration of a vehicle combination 1 is depicted, showing another example of a jack-knifing condition J. Here, the towing truck 10 has hit into a trailer supporting leg 22 of the trailer 20.

Figure 3:
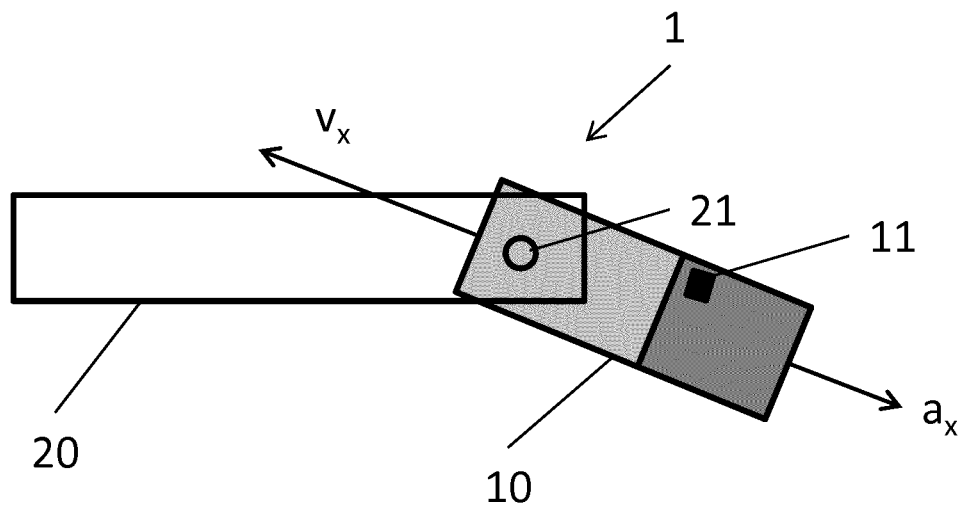
FIG. 3 is showing another schematic illustration of a vehicle combination performing a reversing operation according to an example embodiment of the present invention.

In FIG. 3, a schematic illustration of a vehicle combination 1 during a reversing operation can be seen. The towing truck 10 is reversing at a speed $v_x$ and is connected via a coupling 21 to a trailer 20. The reversing speed $v_x$ is this in this embodiment the speed of the towing truck 10, but may also be regarded as a translation speed of the articulation point 21, i.e. the coupling 21. Moreover, the towing truck may also brake, resulting in a braking acceleration $a_x$, i.e. a deceleration, in an opposite direction to the truck speed $v_x$. During the reversing operation, the vehicle combination 1 may advantageously make use of the updated maximum safe articulation angle $\phi_{lim}$ in order to avoid a jack-knifing condition J and also to be able to in an efficient manner complete the reversing operation.

A control unit 11 may be integrated in the towing truck 1, and being configured to perform the steps of the methods according to any one of the embodiments of the first and/or second aspects of the present invention. As already indicated hereinabove, the reversing operation may be performed semi-automatically or even fully automatically by e.g. the control unit 11 controlling any one of a steering operation and a vehicle speed $v_x$. Alternatively, the reversing operation may also be performed manually by a driver of the vehicle 10.

Figure 4:
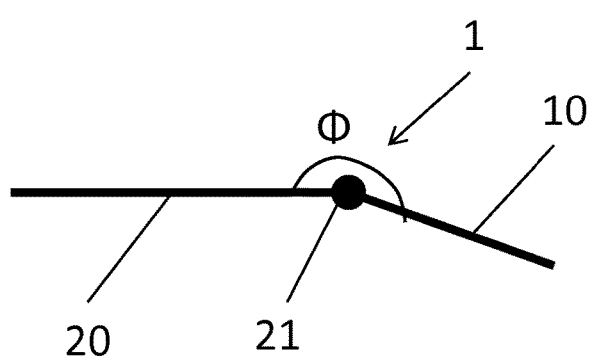
FIG. 4 is showing a principle illustration of a vehicle combination with an articulation angle according to an example embodiment of the present invention
Figure 5:
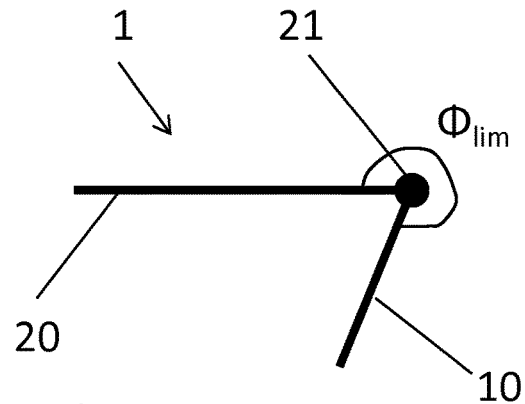
FIG. 5 is showing another principle illustration of a vehicle combination with a maximum safe articulation angle according to an example embodiment of the present invention.

In FIGS. 4 and 5, the articulation angle φ and the maximum safe articulation angle $\phi_{lim}$ of a vehicle combination 1 can be more clearly seen. The figures depict principle illustrations of a vehicle combination 1 which are connected and pivotably movable around the coupling 21, i.e. the articulation point. FIG. 4 may be regarded as a situation during reversing, such as can be seen in FIG. 3, where the vehicle combination 1 in a particular point in time during the reversing operation has a current articulation angle φ which is smaller than the maximum safe articulation angle $\phi_{lim}$ as e.g. seen in FIG. 5. Thus, during the reversing operation as shown in FIG. 4, the articulation angle φ should not exceed the maximum safe articulation angle $\phi_{lim}$, and by the provision of the present invention, a larger range of articulation angles φ may be allowed during the reversing operation without reaching a jack-knifing condition J.

The illustration in FIG. 5 may for example represent a situation during forward driving of the vehicle combination 1 where the maximum safe articulation angle $\phi_{lim}$ is larger than a preset maximum safe articulation angle. Hence, a control unit 11 of the towing vehicle 1 may thereafter update the preset maximum safe articulation to the new and larger maximum safe articulation angle $\phi_{lim}$. The expression "during forward driving" as used herein means thus that the vehicle combination 1 or the towing vehicle 10 is having a speed $v_x$ which is larger than zero and in a forward direction in respect of the vehicle combination 1 or the towing vehicle 10. Hence, the vehicle combination 1 may be regarded as being in use or in operation.

Figure 6:
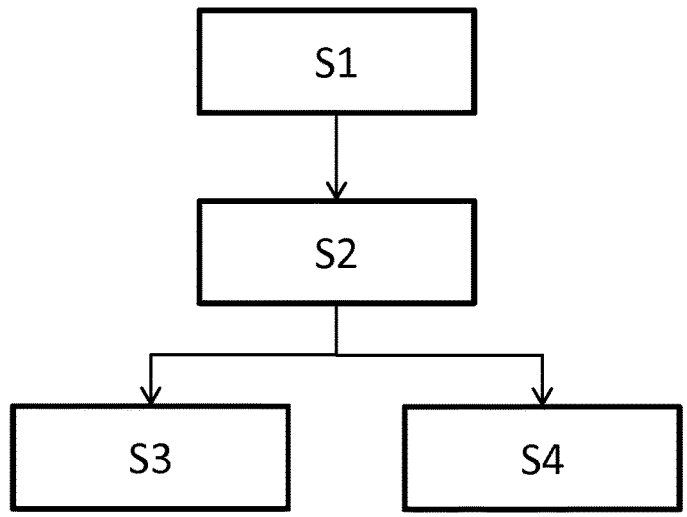
FIG. 6 shows a flowchart of a method according to an example embodiment of the first aspect of the invention.
Figure 7:
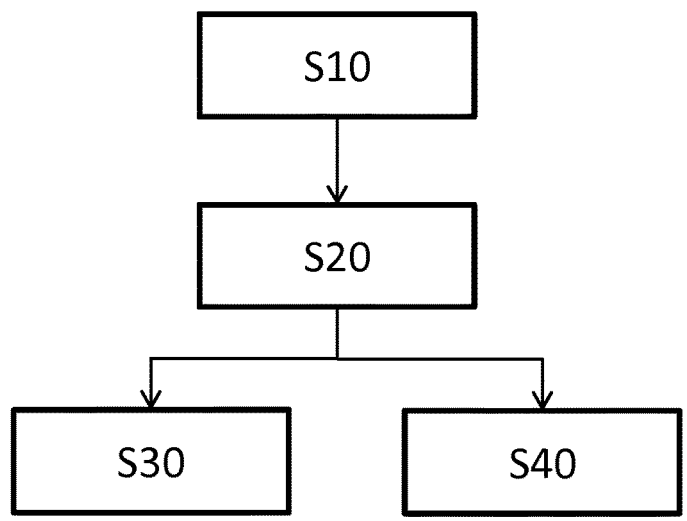
FIG. 7 shows a flowchart of a method according to an example embodiment of the second aspect of the invention.

FIGS. 6 and 7 show flowcharts of example embodiments of the respective methods according to the first and second aspects of the invention.

In step S1 in FIG. 6, a preset maximum safe articulation angle $\phi_{lim}$ is provided for the towing vehicle 10 or the vehicle combination 1. Purely by way of example, the preset maximum safe articulation angle $\phi_{lim}$ may be set to 100 degrees. In step S2, a signal is received being indicative of the articulation angle φ of the vehicle combination 1 during forward driving of the vehicle combination 1. For example, the vehicle combination 1 may be in use and driving forwardly at a shipping terminal area/logistics center area where it is required to make turns with large articulation angles (I). Hence, when it is recognized that the articulation angle φ is larger than the preset maximum safe articulation angle $\phi_{lim}$ during the forward driving, the maximum safe articulation angle $\phi_{lim}$ may be updated in step S3. Purely by way of example, it may be recognized that the articulation angle φ during forward driving is 105 degrees, i.e. larger than the preset maximum safe articulation angle of 100 degrees as mentioned hereinabove. Thereafter, a larger maximum safe articulation angle $\phi_{lim}$, i.e. 105 degrees, may be used as a limit during a subsequent reversing operation of the vehicle combination 1. As a complement, the maximum safe articulation angle $\phi_{lim}$ may also be updated in step S4 when it has been determined that a jack-knifing condition J has occurred, whereby the updated maximum safe articulation angle $\phi_{lim}$ corresponds to an articulation angle φ which occurred prior to the determined jack-knifing condition J. Purely by way of example, in relation to the aforementioned example, it may be determined that a jack-knifing condition occurs already at 98 degrees articulation angle φ, i.e. a value which is smaller than the preset maximum safe articulation angle of 100 degrees. Thereby, the maximum safe articulation angle $\phi_{lim}$ may be updated to an angle being less than 98 degrees instead of 100 degrees, such as 97 degrees or less. The jack-knifing condition J may occur both at forward and rearward driving, and as already explained hereinabove, the jack-knifing condition may be determined by receiving a signal, to e.g. the control unit 11, that indicates that at least one of the following events has occurred:

an emergency call from the vehicle combination has been issued,
an airbag of the towing vehicle has been deployed,
a yaw, pitch or roll rate for the towing vehicle or the at least one trailer has exceeded a preset threshold value,
a longitudinal or lateral acceleration for the towing vehicle or the at least one trailer has exceeded a preset threshold value,
a force in a trailer coupling has exceeded a preset threshold value,
a speed reduction of the towing vehicle or the vehicle combination has exceeded a preset threshold value,
a value being indicative of a second time derivative of the articulation angle has exceeded a preset threshold value.

Vehicles may have integrated solutions for contacting emergency assistance (SOS). An emergency call (or message) can either be triggered by a button accessible to a driver of the vehicle 10 or automatically after e.g. air-bag deployment. The occurrence of an emergency call (or message) can be used as an indication of a possible jack-knifing condition J. It can thus be used to trigger a reset of $\phi_{lim}$ to the value held prior to the event.

Vehicles may also have collision detection sensors installed in various parts of the vehicle. The primary purpose is normally to trigger air-bag after collision. A collision with an obstacle can either be a consequence of a jack-knifing condition J or a jack-knifing condition J could occur after a collision. Irrespective of the case, the onset of a collision sensor could be used to reset $\phi_{lim}$ to the value held prior to the event.

A gyroscope may be used to measure either yaw, pitch or roll rate depending on its physical orientation on the vehicle 10. If either of these signals is observed to have a substantially larger absolute value than what is normal during normal driving it can indicate that a jack-knifing condition J has occurred. It can thus be used to trigger a reset of $\phi_{lim}$ to the value held prior to the event. Abnormality may be defined with a preset limit value.

An accelerometer may be used to measure either longitudinal or lateral acceleration depending on its physical orientation on the vehicle 10. If either of these signals is observed to have a substantially larger absolute value than what is normal during normal driving it can indicate that a jack-knifing condition J has occurred. It can thus be used to trigger a reset of $\phi_{lim}$ to the value held prior to the event. Abnormality may be defined with a preset limit value.

A strain gage, or other devices, may be used to measure forces in different directions in the trailer coupling 21. If either of these signals is observed to have a substantially larger absolute value than what is normal during normal driving it can indicate that a jack-knifing condition J has occurred. It may thus be used to trigger a reset of $\phi_{lim}$ to the value held prior to the event. Abnormality may be defined with a preset limit value.

Wheel speed sensors, GPS, Lidars, crank-shaft speed sensors etc. are all different devices that may be used to measure vehicle speed $v_x$. An abnormal discontinuity in any of these speed measurements may be used to reset $\phi_{lim}$ to the value held prior to the event. More in detail, discontinuity may be defined as a certain, preset, change in signal value within a set time interval.

Trailer-mounted mechanical rotational angle sensors, GPS, Lidars, truck-mounted mechanical rotational angle sensors etc. are all different devices that may be used to measure the articulation angle ϕ. An abnormal discontinuity in any of these measurements may be used to reset $\phi_{lim}$ to the value held prior to the event. More in detail, discontinuity may be defined as a certain, preset, magnitude in signal second derivative.

The flowchart in FIG. 7 shows a method of reversing a vehicle combination 1 comprising a towing vehicle 1 and at least one trailer 20, whereby a reversing operation is initiated in step S10. As already mentioned hereinabove, the reversing operation may be manual, semi-automatic or even fully automatic, and controlled by the control unit 11 in the towing vehicle 10. In a following step S20, the control unit 11 may determine whether a jack-knifing condition J is about to occur by comparing a predicted future estimate of the articulation angle ϕ with the maximum safe articulation angle $\phi_{lim}$ as estimated according to the first aspect of the present invention, such as shown and described in respect of FIG. 6. When it is determined that the jack-knifing condition is about to occur, at least one of a warning signal may be issued, represented by step S30, and a braking action may be initiated for the vehicle combination 1, represented by step S40.

It is to be understood that the present invention is not limited to the embodiments described above and illustrated in the drawings; rather, the skilled person will recognize that many changes and modifications may be made within the scope of the appended claims.

The invention claimed is:

1. A method for reversing a vehicle combination comprising a towing vehicle and at least one trailer, the method comprising:
reversing the vehicle combination,
determining, by the control unit, whether a jack-knifing condition is about to occur by comparing a predicted future estimate of the articulation angle with a maximum safe articulation angle by:
providing, at the control unit, a preset maximum safe articulation angle for the towing vehicle or the vehicle combination,
receiving, by the control unit, a signal being indicative of an articulation angle of the vehicle combination during forward driving of the vehicle combination, and
updating, by the control unit, the maximum safe articulation angle when the articulation angle of the vehicle combination during forward driving is larger than the preset maximum safe articulation angle,
updating, by the control unit, the maximum safe articulation angle upon determination that a jack-knifing condition has occurred, whereby the updated maximum safe articulation angle corresponds to an articulation angle which occurred prior to the determined jack-knifing condition, and
upon determination that the jack-knifing condition is about to occur, initiating, by the control unit,
a braking action for the vehicle combination.

2. The method of claim 1, wherein the signal being indicative of the articulation angle is continuously or intermittently recorded during forward driving.

3. The method of claim 1, wherein the jack-knifing condition is determined by receiving a signal that indicates that at least one of the following events has occurred:
an emergency call from the vehicle combination has been issued,
an airbag of the towing vehicle has been deployed,
a yaw, pitch or roll rate for the towing vehicle or the at least one trailer has exceeded a preset threshold value,
a longitudinal or lateral acceleration for the towing vehicle or the at least one trailer has exceeded a preset threshold value,
a force in a trailer coupling has exceeded a preset threshold value,
a speed reduction of the towing vehicle or the vehicle combination has exceeded a preset threshold value,
a value being indicative of a second time derivative of the articulation angle has exceeded a preset threshold value.

4. The method of claim 1, wherein the predicted future estimate of the articulation angle is derived from the current articulation angle and a first order time derivative of the current articulation angle.

5. The method of claim 1, wherein the predicted future estimate of the articulation angle is derived from the current articulation angle and a second order time derivative of the current articulation angle.

6. The method of claim 1, wherein the braking action is initiated, by the control unit, when the following condition is fulfilled:

$$\left| \phi + \frac{\dot\phi v_x}{a_x} + \ddot\phi \left(\frac{v_x}{a_x}\right)^2 / 2 \right| > \phi_{lim}$$

wherein $v_x$ corresponds to a reversing speed, $a_x$ corresponds to an achievable acceleration rate of the vehicle combination's braking system, Φ corresponds to the articulation angle, $\dot\phi$ corresponds to the first order time derivative of the articulation angle, $\ddot\phi$ corresponds to the second order time derivative of the articulation angle and $\Phi_{lim}$ corresponds to the maximum safe articulation angle.

7. The method of claim 1, further comprising issuing a warning signal, by the control unit, when the following condition is fulfilled:

$$\left| \phi + \dot\phi\left(\frac{v_x}{a_x} + t_{reac}\right) + \ddot\phi\left(\frac{v_x}{a_x} + t_{reac}\right)^2 / 2 \right| > \phi_{lim}$$

wherein $v_x$ corresponds to the reversing speed, $a_x$ corresponds to the achievable acceleration rate of the vehicle combination's braking system, Φ corresponds to the articulation angle, $\dot\phi$ corresponds to the first order time derivative of the articulation angle, $\ddot\phi$ corresponds to the second order time derivative of the articulation angle, $t_{reac}$ corresponds to an estimated driver reaction time from the warning signal is issued until a braking action has been initiated by the driver and $\Phi_{lim}$ corresponds to the maximum safe articulation angle.

8. The method of claim 1, wherein a value being indicative of a current steering wheel angle or a first derivative of the steering wheel angle is also used for determining if a jack-knifing condition is about to occur.

9. The method of claim 1, wherein at least one of a steering operation and a speed control operation of the vehicle combination during reversing is performed automatically without any direct human involvement.

10. A towing vehicle comprising a control unit configured to:
determine whether a jack-knifing condition is about to occur by comparing a predicted future estimate of the articulation angle with a maximum safe articulation angle by:

providing, at the control unit, a preset maximum safe articulation angle for the towing vehicle or the vehicle combination, receiving, by the control unit, a signal being indicative of an articulation angle of the vehicle combination during forward driving of the vehicle combination, and updating, by the control unit, the maximum safe articulation angle when the articulation angle of the vehicle combination during forward driving is larger than the preset maximum safe articulation angle, updating, by the control unit, the maximum safe articulation angle upon determination that a jack-knifing condition has occurred, whereby the updated maximum safe articulation angle corresponds to an articulation angle which occurred prior to the determined jack-knifing condition;

wherein the control unit is further configured to, upon determination by the control unit that the jack-knifing condition is about to occur, initiate a braking action for the vehicle combination.

11. The towing vehicle according to claim 10, wherein the towing vehicle is a semi-autonomous or a fully autonomous vehicle.

12. The towing vehicle according to claim 10, comprising determining, by the control unit, an articulation angle between at least one of:

the towing vehicle and a connected trailer; or two interconnected trailers.

* * * * *